(12) United States Patent
Johnson et al.

(10) Patent No.: US 6,301,885 B1
(45) Date of Patent: Oct. 16, 2001

(54) HYDROSTATIC TRANSMISSION HAVING TWO-PIECE PUMP AND MOTOR BLOCK ASSEMBLY

(75) Inventors: Kevin J. Johnson; Norman E. Jolliff, both of Salem, IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/498,666

(22) Filed: Feb. 7, 2000

Related U.S. Application Data

(60) Provisional application No. 60/145,619, filed on Jul. 26, 1999, and provisional application No. 60/119,381, filed on Feb. 9, 1999.

(51) Int. Cl.[7] .................................................. F16D 39/00
(52) U.S. Cl. ........................................................... 60/487
(58) Field of Search ............................ 60/487; 74/606 R; 384/592

(56) References Cited

U.S. PATENT DOCUMENTS

| 2,503,530 | * | 4/1950 | Weber ................................. 384/592 |
| 4,893,524 | | 1/1990 | Ohashi et al. . |
| 5,339,631 | * | 8/1994 | Ohashi ................................... 60/487 |
| 5,473,964 | | 12/1995 | Okada et al. ....................... 74/606 R |
| 5,768,892 | | 6/1998 | Hauser et al. ......................... 60/487 |

* cited by examiner

Primary Examiner—John E. Ryznic
(74) Attorney, Agent, or Firm—Baker & Daniels

(57) ABSTRACT

A variable displacement hydraulic pump includes a pump cylinder barrel having a plurality of axially arranged cylinder chambers disposed therein and each cylinder chamber includes a reciprocating piston therein. The pump is rotatably supported by the pump block and a motor block is separable from and connected to the pump block. A hydraulic motor is rotatably supported by the motor block and hydraulically connected to the pump through a pair of continuous passages formed in the pump and motor blocks. The motor includes an axis of rotation substantially perpendicular to an axis of rotation of the pump. A motor includes a cylinder barrel having a plurality of axially arranged cylinder chambers disposed therein and each cylinder chamber has a reciprocating piston therein. A thrust bearing is supported by a portion of the pump and motor block and is receivably engaged with the pistons extended from the cylinder barrel of the motor. A stop member is attached to the portion of the pump and motor block and in contact with the thrust bearing wherein relative movement of the thrust member is restrained by the stop member.

21 Claims, 8 Drawing Sheets

FIG_3

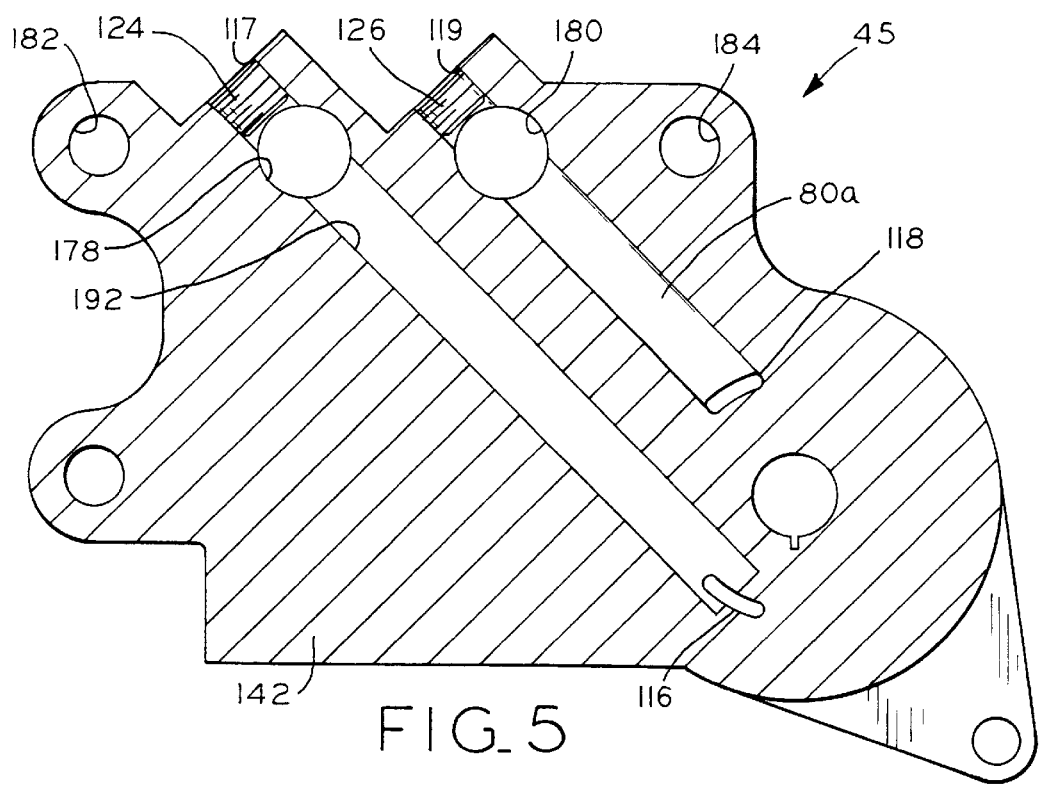
FIG_5
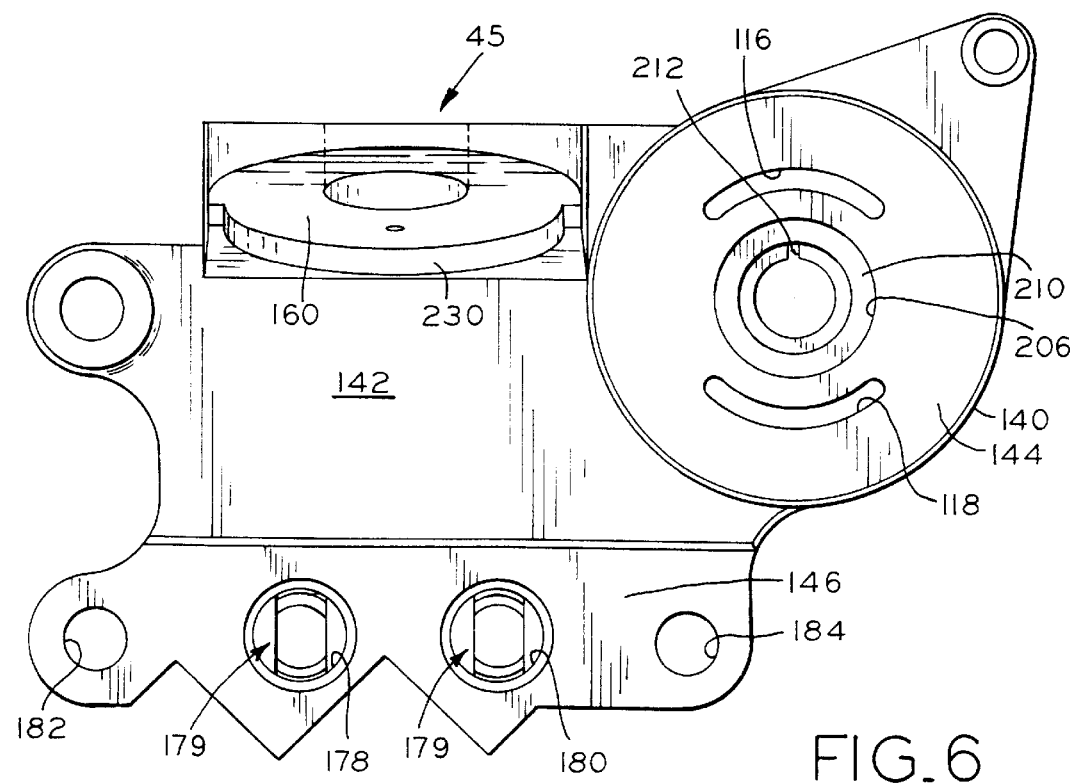
FIG_6

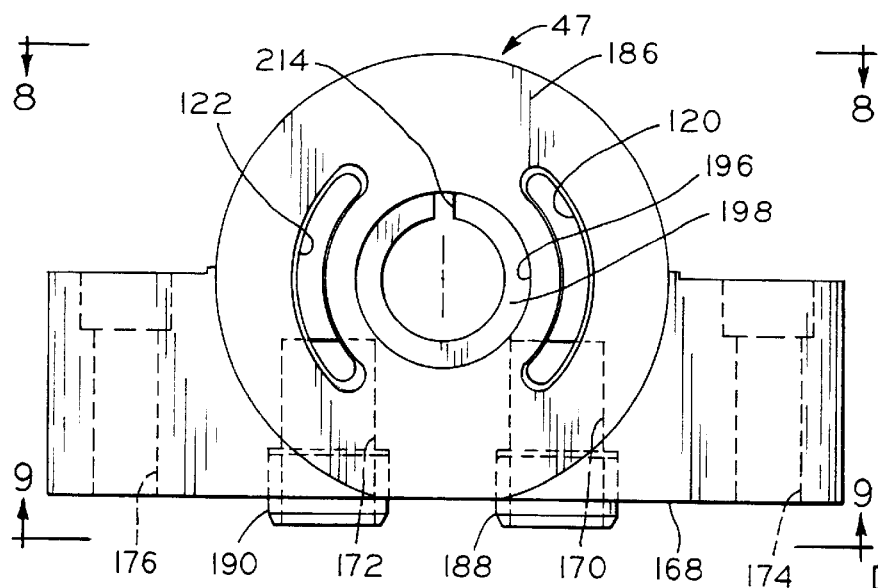
FIG_7
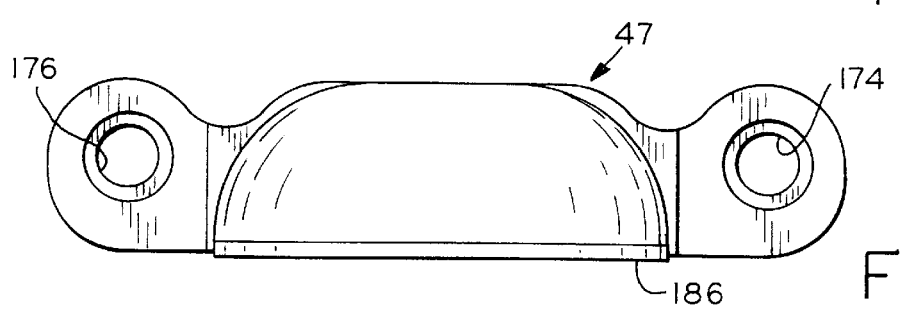
FIG_8
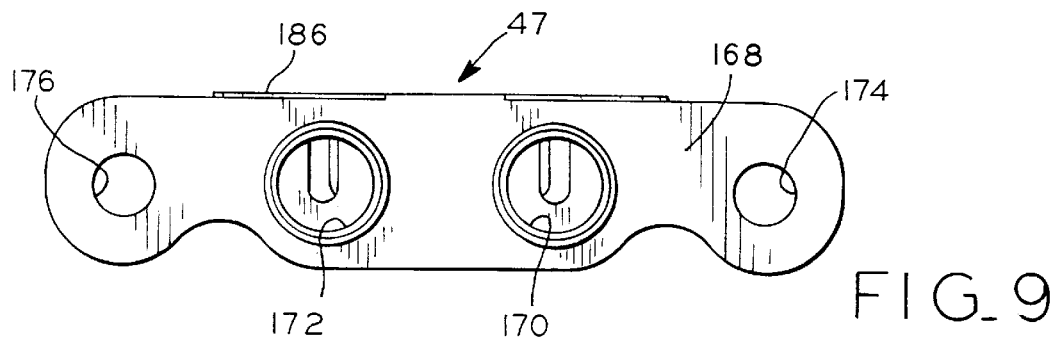
FIG_9

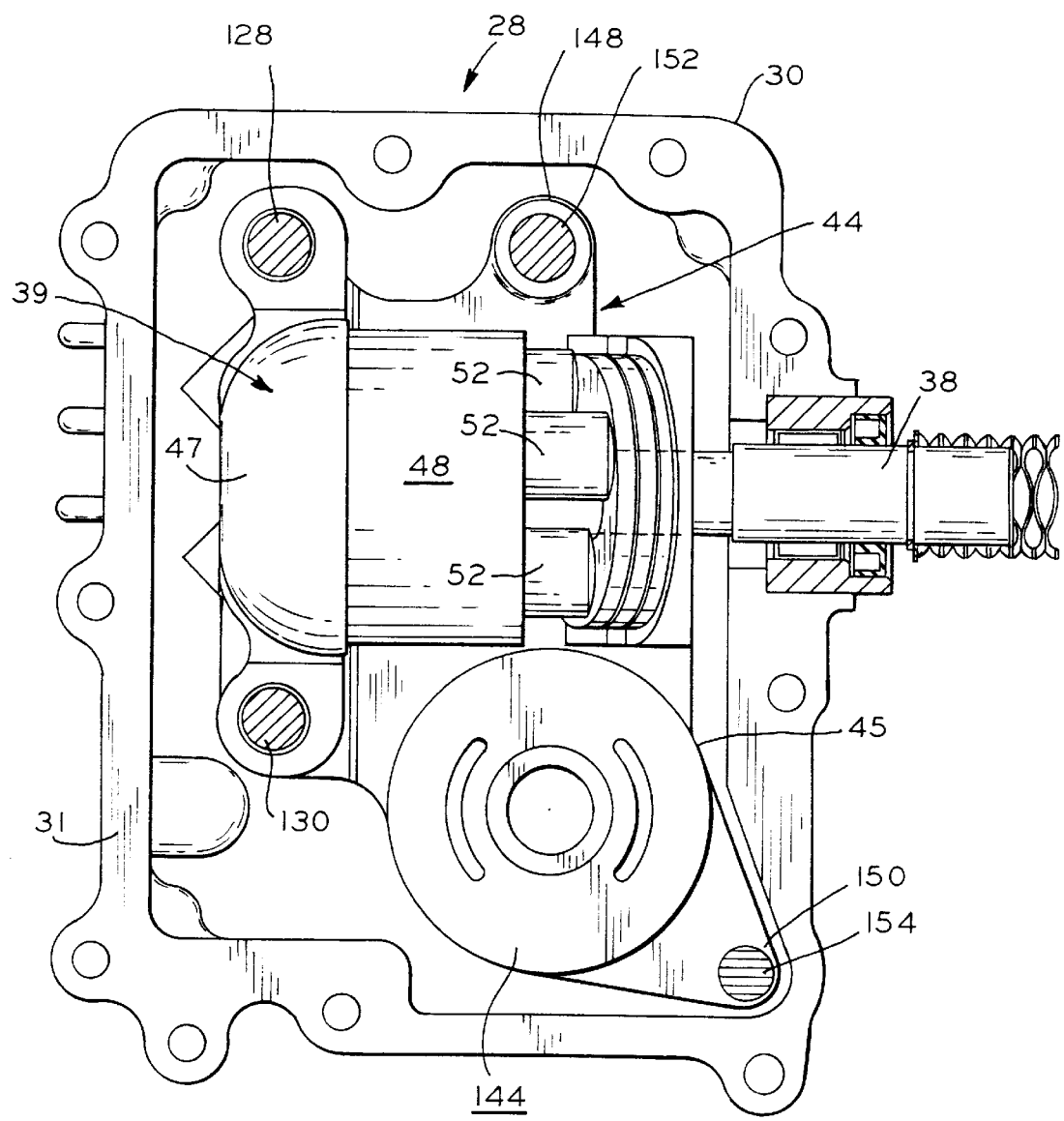
FIG_10

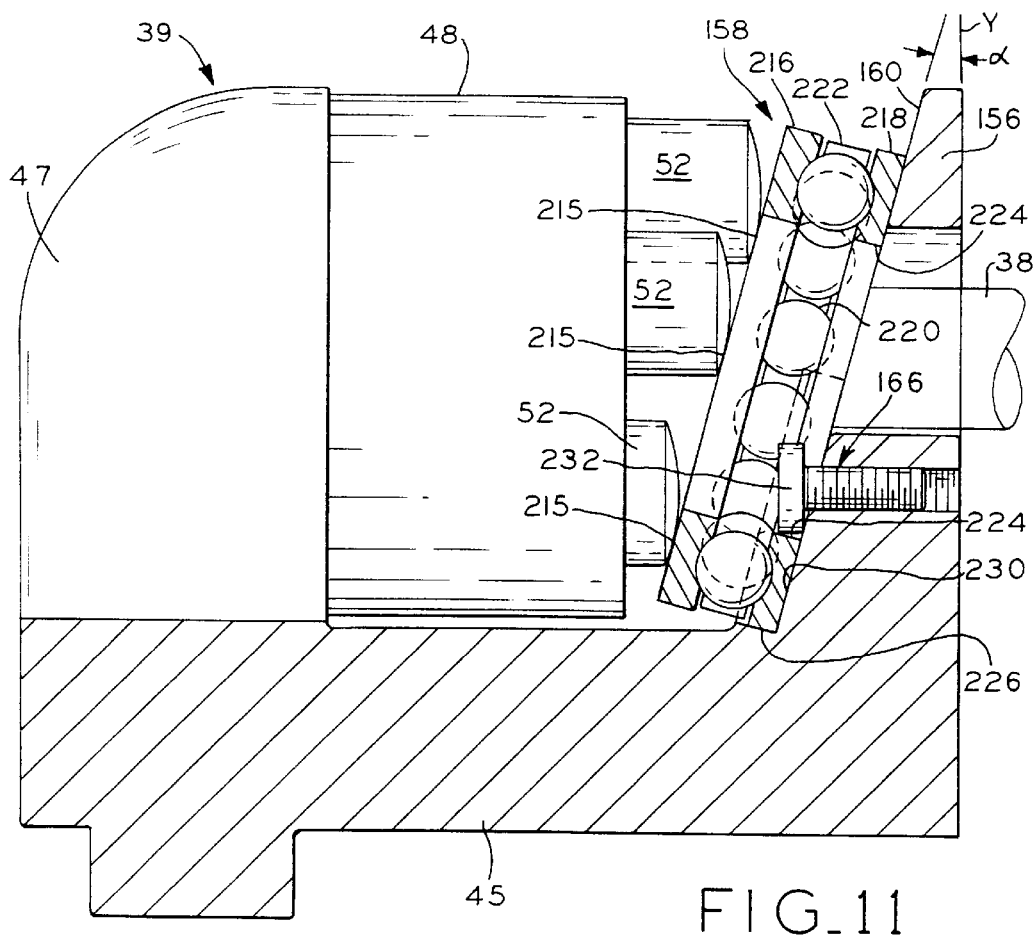
FIG_11
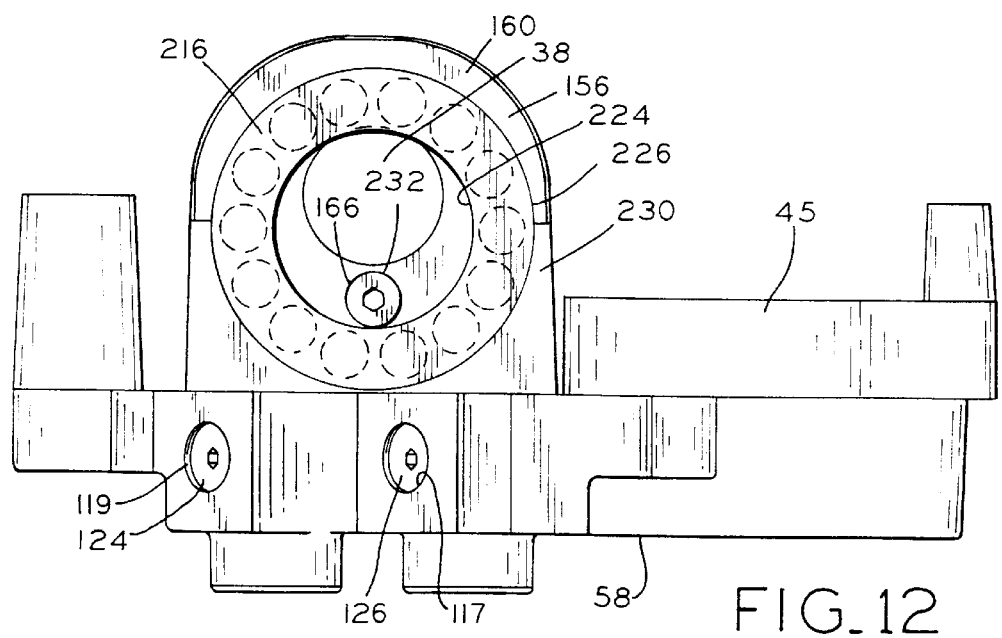
FIG_12

HYDROSTATIC TRANSMISSION HAVING TWO-PIECE PUMP AND MOTOR BLOCK ASSEMBLY

CROSS-REFERENCE TO RELATED APPLICATION

This application is related to and claims the benefit under 35 U.S.C. §119(e) of United States Provisional Applications Ser. No. 60/119,381 filed Feb. 9, 1999 and Ser. No. 60/145,619 filed Jul. 26, 1999.

BACKGROUND OF THE INVENTION

The present invention relates to hydrostatic transaxles intended primarily for use in the lawn and garden industry on riding lawnmowers, lawn and garden tractors and the like, but may also be applied to larger implements and vehicles.

Hydrostatic transmissions transmit rotary mechanical motion, typically from an internal combustion engine, to fluid motion, typically oil, and then back to rotary mechanical motion to rotate a pair of drive axles in order to drive the vehicle. The hydrostatic transmission controls the output rotary mechanical motion such that varying output speeds in the forward and reverse directions are possible with a single speed input rotary mechanical motion. Such transmissions have utilized radial piston pumps and motors, axial piston pumps and motors and hybrid transmissions wherein the pump may be of the radial piston design, for example, and the motor formed as a gear pump. The speed of the output of the transmission is typically controlled by varying the eccentricity of the pump track ring or swash plate.

A typical construction of the hydrostatic transmission component of the transaxle includes a block common to both the pump and motor units, often referred to as a "center section." The center section facilitates an external mounting surface for a motor cylinder barrel and a pump cylinder barrel, and additionally, internal passages body for providing hydraulic communication between the pump and motor cylinder barrels. Conventionally, the pump and motor cylinder barrel axes of rotation are 90 degrees relative to one another. Center section machining is difficult because the center section is substantial in size and machined surfaces are substantially perpendicular, often requiring multi-axis machining capabilities. This corresponds to a significant cost associated with this design type.

Moreover, many HSTs heretofore require that the pump and motor mechanism unit be matched to a fixed swash plate prior to mounting the mechanism into the casing. Typically, assembly requires positioning the fixed swash plate in the casing, mounting the pump and motor mechanism into the casing then taking measures to ensure the fixed swash plate is suitably aligned with the pump and motor mechanism. Arranging the fixed swash plate and pump and motor mechanism, in the manner described above, poses a significant step in the assembly process which represents additional cost.

SUMMARY OF THE INVENTION

The present invention provides a variable displacement hydraulic pump including a pump cylinder barrel having a plurality of axially arranged cylinder chambers disposed therein and each cylinder chamber includes a reciprocating piston therein. The pump is rotatably supported by the pump block and a motor block is separable from and connected to the pump block. A hydraulic motor is rotatably supported by the motor block and hydraulically connected to the pump through a pair of continuous passages formed in the pump and motor blocks. The motor includes an axis of rotation substantially perpendicular to an axis of rotation of the pump.

The present invention further provides a hydrostatic transmission including a variable displacement hydraulic pump having a pump cylinder barrel with a plurality of axially arranged cylinder chambers disposed therein. Each cylinder chamber includes a reciprocating piston therein. The pump is rotatably supported by a pump and motor block. A motor, which is hydraulically connected with the pump, includes a cylinder barrel having a plurality of axially arranged cylinder chambers disposed therein and each cylinder chamber has a reciprocating piston therein. The motor includes an axis of rotation substantially perpendicular to an axis of rotation of the pump. A thrust bearing is supported by a portion of the pump and motor block and is engaged with the pistons extended from the cylinder barrel of the motor. A stop member is attached to the portion of the pump and motor block and retains the thrust bearing wherein relative movement of the thrust member is restrained by the stop member.

BRIEF DESCRIPTION OF THE DRAWINGS

The above-mentioned and other features and objects of this invention, and the manner of attaining them, will become more apparent and the invention itself will be better understood by reference to the following description of the invention taken in conjunction with the accompanying drawings, wherein:

FIG. 5 is a sectional view of the pump block along line 5—5 of FIG. 4;

FIG. 6 is a top view of the pump block of FIG. 4;

FIG. 7 is a front elevation view of the motor block of FIG. 4;

FIG. 8 is a top view of the motor block of FIG. 7;

FIG. 9 is a bottom view of the motor block of FIG. 7;

FIG. 10 is a top view of the hydrostatic transmission with the top portion of the casing and the pump cylinder barrel removed;

FIG. 11 is a sectional view of the pump block and thrust bearing assembly taken along a vertical plane showing retainment of the thrust bearing; and FIG. 12 is a elevated front view of the pump block and thrust bearing assembly of FIG. 11.

DETAILED DESCRIPTION OF THE INVENTION

Figure 1:
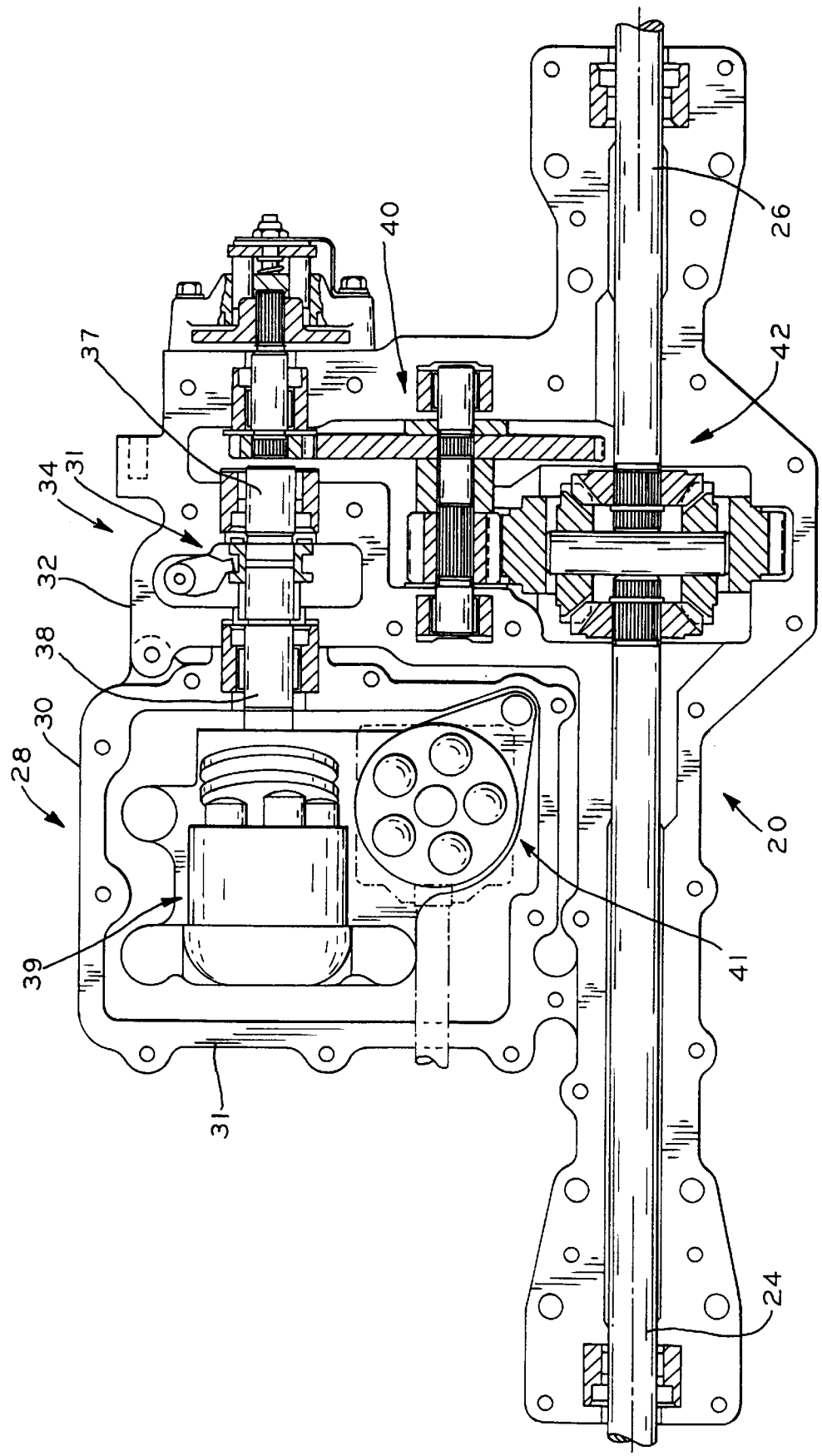
FIG. 1 is a sectional view of the transaxle of the present invention taken along a horizontal plane including the axes of the axles.
Figure 2:
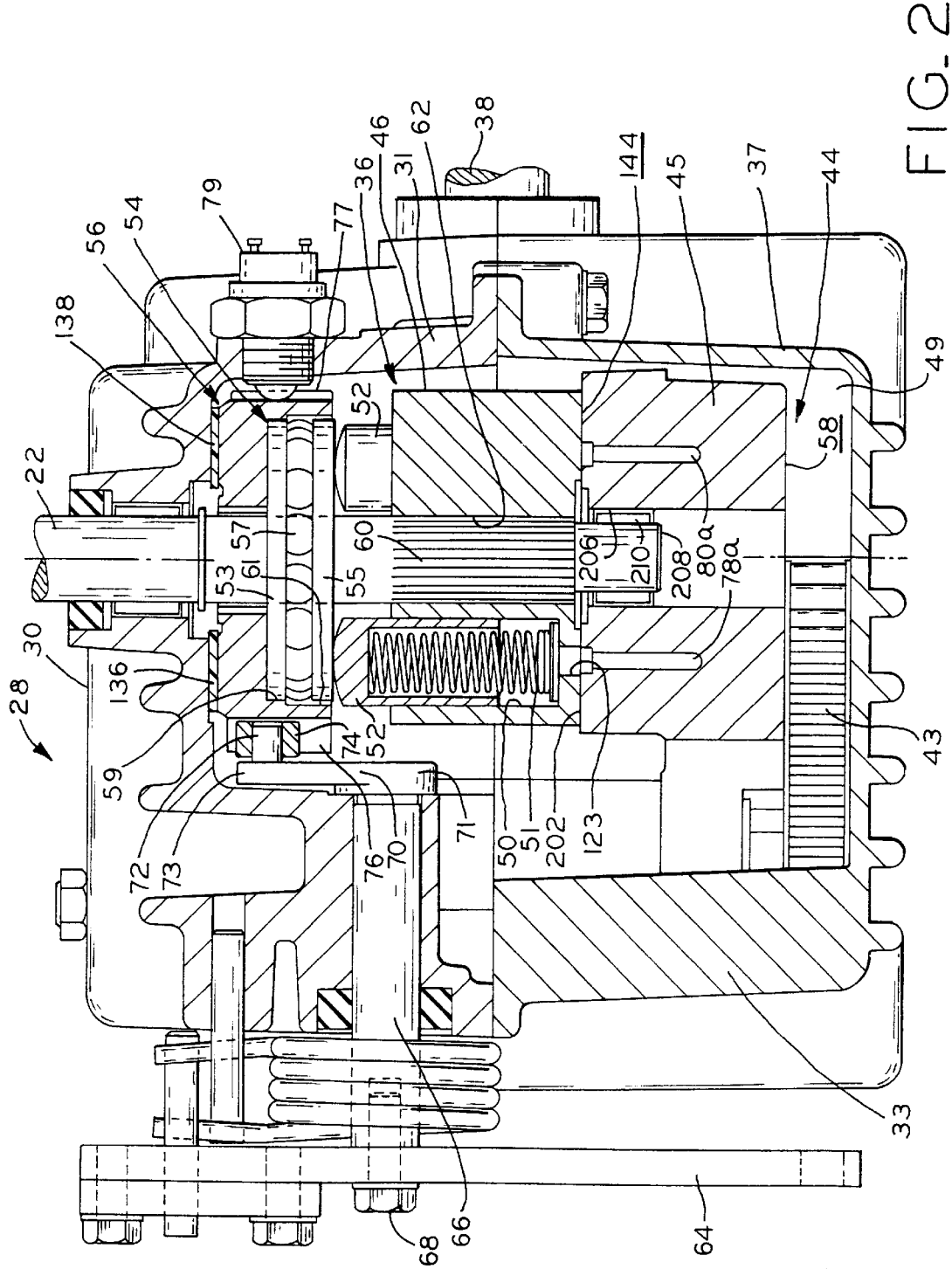
FIG. 2 is a sectional view of the hydrostatic transmission taken along a vertical plane.

Referring to FIG. 1, transaxle 20 is driven by a power source, typically an internal combustion engine (not shown), whereby transaxle 20 transfers power generated from the power source to a variable and controllable power provided to a pair of drive axles 24 and 26, respectively. Transaxle 20 includes a modular hydrostatic transmission 28, enclosed in casing 30, and removably attachable to modular axle casing 32. Casing 30 includes a pair of casing halves, upper casing half 31 and lower casing half 33 (FIG. 2). Axle mechanism casing 32 encloses reduction gear train 40 and differential mechanism 42 of transaxle 20. Output shaft 38 extends between hydrostatic transmission casing 30 and axle mechanism casing 32 and includes a mechanical disconnect mechanism 31 of the type disclosed in U.S. Pat. No. 5,701,738 and co-pending U.S. patent application Ser. No. 09/498,692 entitled HYDROSTATIC TRANSAXLE HAVING AXIAL PISTON MOTOR AND METHOD FOR MANUFACTURING TRANSAXLES, filed simultaneously herewith, and assigned to the assignee of the present application, the disclosure of which is expressly incorporated herein by reference. Mechanical disconnect mechanism 31 is provided to removably disengage axle mechanism 34 from hydrostatic transmission 28. Axle mechanism 34 includes differential mechanism 42, reduction gear train 40 and output shaft 37. Output shaft 38 attached to motor 39 engages with reduction gear train 40 which, in turn, drives differential mechanism 42 to provide power to drive axles 24 and 26.

Figure 3:
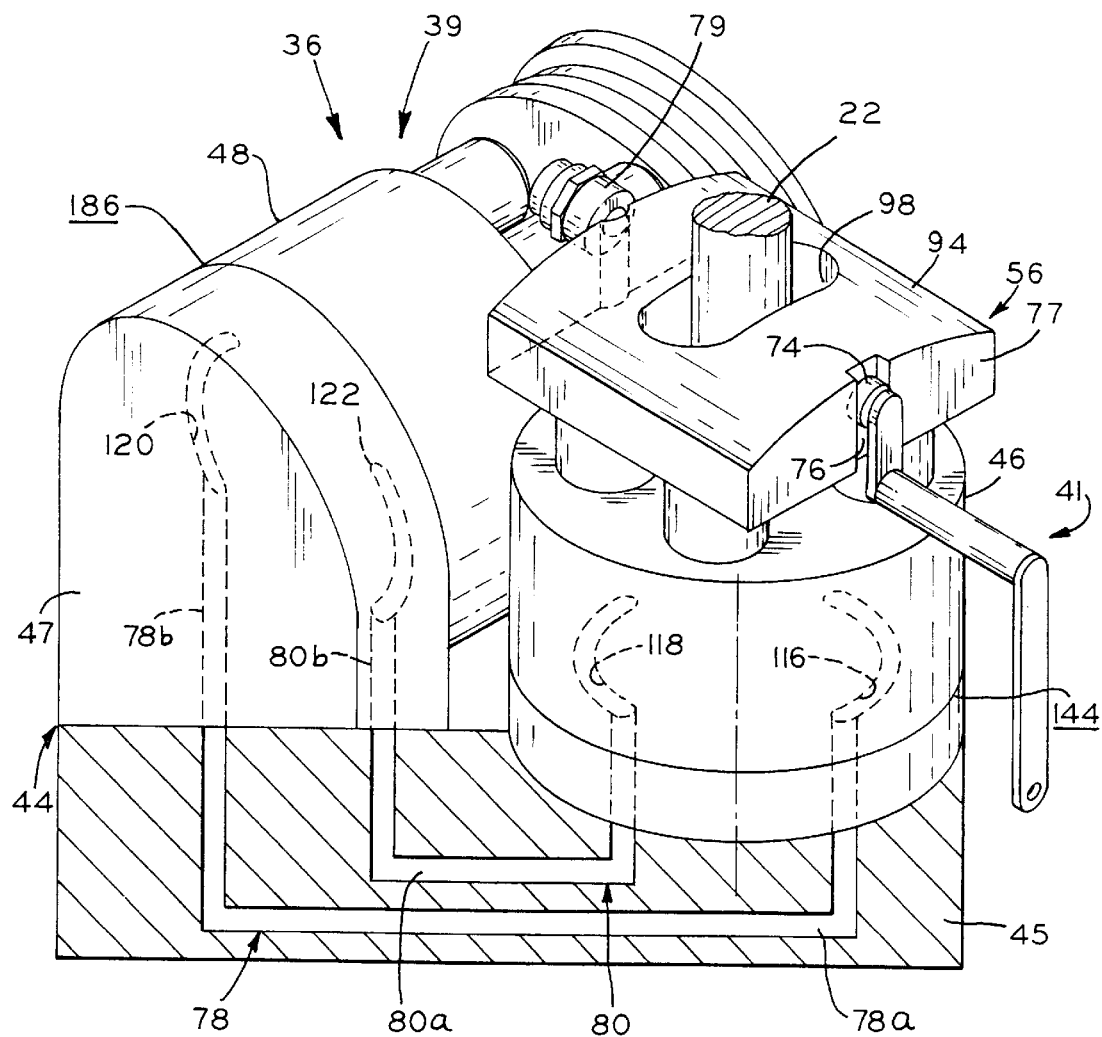
FIG. 3 is a perspective view of the pump and motor assembly partially in section showing the fluid passages.
Figure 4:
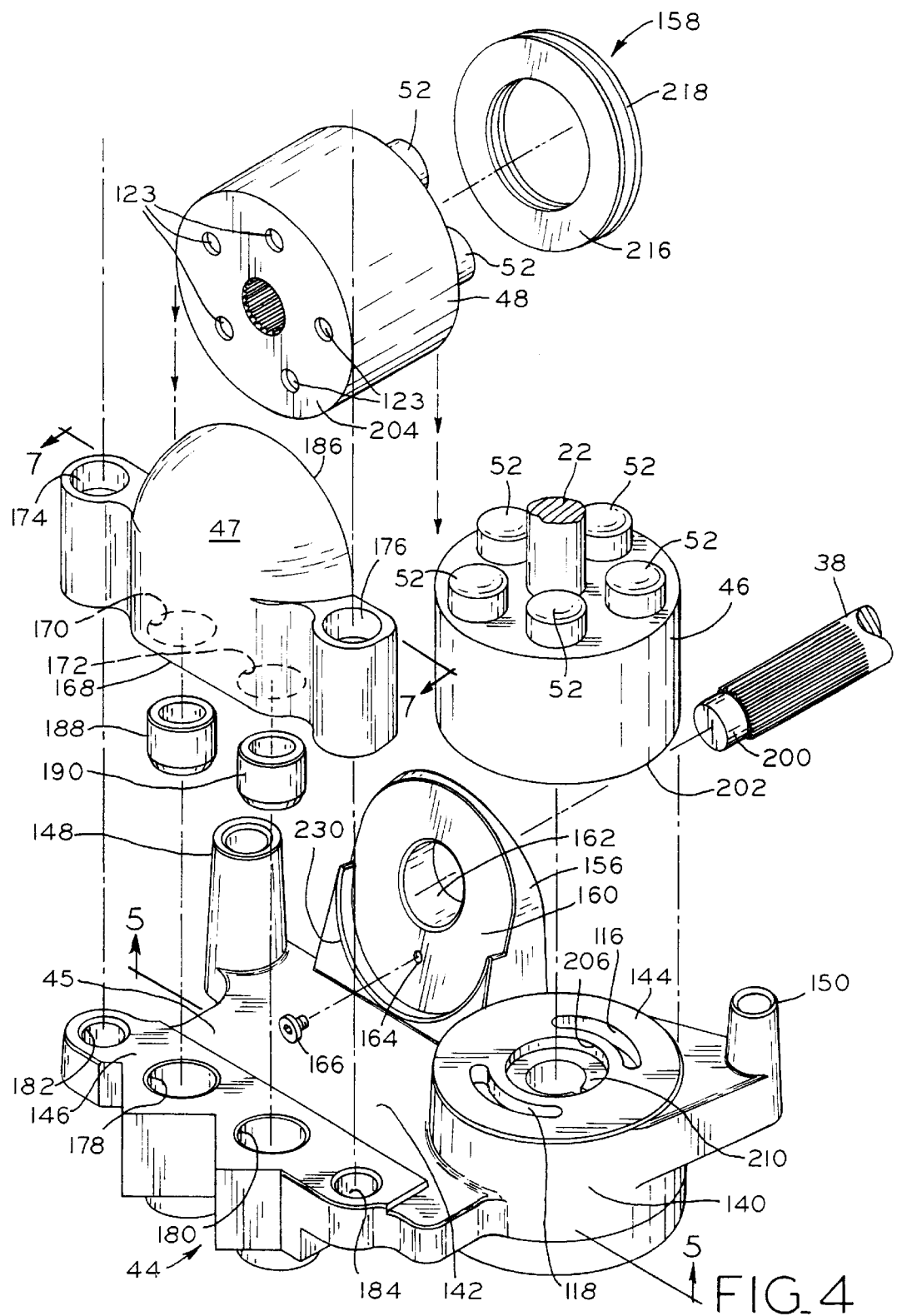
FIG. 4 is an exploded view of the pump and motor assembly.

Referring to FIG. 2, shown is hydrostatic transmission module 28 of transaxle 20, including pump and motor mechanism 36 comprising pump 41, motor 39 (FIGS. 1, 3 and 10), and pump and motor block assembly 44 (FIG. 3). Pump and motor block assembly 44 includes a two piece structure wherein pump block 45 is joined with motor block 47 to provide a single unit (FIGS. 3 and 4). Fastened to pump and motor block assembly 44 are pump cylinder barrel 46 and motor cylinder barrel 48 (FIG. 3). Pump cylinder barrel 46 includes a plurality of axially arranged cylinder chambers 50 having pistons 52 disposed in each cylinder chamber 50. Typically, pump cylinder barrel 46 and pistons 52 are common and interchangeable with motor cylinder barrel 48 and respective pistons 52 disposed therein to decrease costs associated with manufacturing separate components. Springs 51 are provided within each cylinder chamber 50 and contact pistons 52 to urge pistons 52 toward and against a respective swash plate. Thrust bearing 54 is axially arranged, respective of pump cylinder barrel 46, and in contact with the ends of pistons 52. Thrust bearing 54 comprises a pair of grooved plates 53, 55, separated by a plurality of ball bearings 57 fitted within the respective grooves of plates 53 and 55. Thrust bearing 54 fits snugly within swash block or swash plate 56, specifically plate 53 of thrust bearing 54 engages bore 59 (FIGS. 2–7) of swash plate 56. Counterbore 61 includes a diameter slightly larger than bore 59 to provide rotational clearance for plate 55 of thrust bearing 54 to rotate freely within swash plate 56.

Operation of hydrostatic pump and motor mechanism 36, through movement of swash plate 56 to effectuate variable rotational movement of the motor cylinder barrel 48, will be described. Customarily, pump cylinder barrel 46 is driven by the power source through input shaft 22. Typically, input shaft 22 includes a first end attached to a pulley (not shown) and the pulley is belt driven by the power source. The other end of input shaft 22 includes a splined portion 60 disposed on the surface of input shaft 22 and engages matching splined portion 62 formed within pump cylinder barrel 46. Referring to FIG. 3, swash plate 56, selectively controlled by shift lever 64, which extends externally to the hydrostatic transmission casing 31, initiates fluid displacement within pump cylinder barrel 46 to transfer power from input shaft 22 to drive axles 24, 26.

Referring to FIG. 2, hydraulic fluid provided in sump 49 at lower portion 37 of casing 28, is drawn into pump and motor mechanism 36 first, through filter 43, then through intake ports 178, 180 (FIG. 5) provided in lower surface 58 of pump block 45. Each intake port includes a check valve 179 to provide make-up oil and sustain a suitable hydraulic pressure in pump and motor mechanism 36. Shift lever 64 is attached to rotatable control arm 70 by screw 68, external of casing 30. Control arm 70 includes first end 71 attached to control rod 66 and a second end 73 extending outwardly and generally perpendicular from control rod 66. Second end 73 of control arm 70 swings through an arc respective of control rod 66 when control rod 66 is rotated. Pin 72 attaches to second end 73 of control arm 70 and extends into slot 76 disposed on the end 77 of swash plate 56. Friction roller 74 fits over pin 72 and freely rotates about pin 72 to engage with slot 76 of swash plate 56. Selectively positioning control lever 64, typically by an operator depressing a foot pedal linked thereto through linkage means, causes swash plate 56 to tilt, and in turn, pistons 52, orbiting about input shaft 22, to reciprocate causing fluid in each cylinder chamber 50 to pressurize as the respective piston retracts. Swash plate 56 tilts and rotates against a pair of low friction bearing strips attached to the casing as described below. Neutral start switch 79 (FIGS. 2 and 3) is provided to electrically communicate with an ignition circuit (not shown) to prevent starting of the engine when the transmission is engaged.

FIG. 3 further illustrates the hydraulic connection between pump cylinder barrel 46 and motor cylinder barrel 48 through pump and motor block assembly 44. Input shaft 22 extends through oval slot 98 which is positioned generally in the center of first lateral surface 94 of swash plate 56. Upper surface 94 of swash plate 56 is arcuate and swash plate 56 tilts respective of casing 30 (FIG. 2). Surface 94 of swash plate 56 engages a pair of TEFLON impregnated DELRIN or other suitable low friction arcuate bearing strips 136, 138 respectively, attached to an interior portion of casing 30 (FIG. 2).

A pair of arcuate openings 116 and 118 disposed in pump block 45 are hydraulically connected to a pair of arcuate openings 120 and 122 disposed in motor block 47 (FIG. 3). Passages 78a and 80a, disposed in pump block 45, and sub-passages 78b and 80b, disposed in motor block 47 are continuous within pump and motor block assembly 44 and hydraulically connect pump openings 116 and 118, respectively, to motor openings 120 and 122. Passages 78 and 80 may be formed by, for example, machining cross holes within pump and motor block assembly 44 which intersect corresponding arcuate openings 116, 118, 120 and 122. Referring to FIGS. 5 and 12, passages 78a, 80a may be machined in pump block 45 by providing a pair of entrance holes 117, 119 formed by, for example, a drilling procedure followed by plugging each hole 117, 119 with respective plugs 124, 126. Alternatively, passages 78a and 80a may be formed by providing foam cores during the casting process to eliminate additional machining and plugging of pump block 45. Arcuate pump openings 116, 118, in pump block 45, and arcuate openings 120, 122 in motor block 47 may be machined.

Referring to FIG. 4, pump and motor block assembly 44 includes pump block 45 and motor block 47 joined together. Pump block 45 includes cylindrical portion 140 joining rectangular body portion 142. Raised circular face 144 is provided on cylindrical portion 140 and defines a mounting surface for pump cylinder barrel 46. Rectangular body portion 142 of pump block 45 includes a raised rectangular motor block mounting surface 146 which provides a surface to attach motor block 47. A pair of annular column portions 148, 150 are integral to pump block 45 and each includes a fastener 152, 154 extending through to fasten pump and motor block assembly 44 to upper casing half 31 of casing 30 (FIG. 10). A projecting bearing cradle 156, to provide a seat for fixed thrust bearing 158, is integral with body portion 142 of pump block 45. Bearing cradle 156 includes an annular face 160 which is substantially smooth and flat in the "as-cast" condition, thus this surface requires little if any machining. The pump block may be constructed of an aluminum alloy and fabricated by, for example, a casting process. Annular face 160 is inclined at angle α, respective of vertical reference plane Y (FIG. 11), to suitably cause motor pistons 52 to reciprocate, within cylinders 48. Preferably, α is 15°. Clearance hole 162 is generally centered in face 160 of bearing cradle 156 and end 200 of output shaft 38 extends through clearance hole 162 and is splined to motor cylinder barrel 48. Hole 164 is threaded and disposed in a lower portion of inclined face 160 to receive stop member 166 such as a screw to retain thrust bearing 158.

Motor block 47 includes mounting surface 168 (FIGS. 4 and 9) which overlays block mounting surface 146 of rectangular portion 142 of pump block 45. Referring to FIGS. 6–9, motor block 47 includes a pair of circular fluid ports 170, 172 positioned between a pair of outer fastener clearance holes 174, 176, which respectively align with and overlay respectively, a pair of circular fluid ports 178, 180 and a pair of outer holes 182, 184 within pump block 45 (FIG. 4). Screws 128, 130 extend through respective clearance holes 174, 176 within motor block 47 and through holes 182, 184 within pump block 45 and are threaded into upper casing half 30. Motor block 47 includes raised circular mounting face 186, which is substantially perpendicular to block mounting surface 168, to which motor cylinder barrel 48 is rotatingly mounted. As best seen in FIGS. 4 and 7, a pair of inserts 188, 190 made of powder metal are press-fit and disposed between respective pump and motor blocks 45, 47 to suitably seal and align fluid ports 178, 180 of pump block 45 with fluid ports 170, 172 of motor block 47.

Referring to FIGS. 4 and 7, motor mount face 186 also centered hole 196 extending substantially perpendicular to face 186, and receiving bushing 198 therein. Bushing 198 provides support for the rotating output shaft 38 extending through motor cylinder barrel 48 to align motor cylinder barrel 48. Motor block 47 may be formed by, for example, a powder metal process, which provides suitable smooth and continuous walls defining sub-passages 78b, 80b. Thus, motor block 47, joined to pump block 45 comprising pump and motor block assembly 44, provides two complete and continuous passages 78, 80 extending from pump mount face 144 to motor mount face 186 (FIG. 3).

Referring to FIG. 4, as pump cylinder barrel 46 is driven by input shaft 22, face 202 of pump cylinder barrel 46 abuts face 144 of pump block 45. Similarly arranged is face 204 of motor cylinder barrel 48 against face 186 of motor block 47. Referring to FIGS. 2 and 4, faces 202, 204 of respective pump and motor cylinder barrels 46, 48 include ports 123 through which hydraulic fluid flows to and from arcuate openings 116, 118 and 120, 122. Thus, the barrels must be in close proximity with the arcuate orifices disposed in the motor and pump blocks to sustain a suitable hydraulic connection between the pump and motor during operation. As is known, it is desirable to retain an amount of pressurized fluid disposed between the barrel face and the block mount face, often referred to as "floating" the barrel. Floating provides a dynamic seal and contemporaneously reduces friction between the barrel and the mount face during operation of the pump and motor mechanism.

As best seen in FIG. 2, pump cylinder barrel 46 aligns with face 144 of pump block 45 due to end 208 of input shaft 22 received in bearing 210, which is press-fit into bore 206. Alternatively, bearing 210 may be replaced by a solid bearing made from a suitable bearing material as is customary. Bore 206 is generally centered about face 144 of pump block 45. As shown in FIG. 6, bearing 210, proximate face 144 within pump block 45, includes slot 212 axially positioned along the length of bearing 210. In operation, slot 212 allows excess oil to return to lower casing half 33 of casing 30, and additionally, acts as a hydraulic pressure relief. Otherwise, the quantity of oil trapped beneath barrel face 202 tends to "lift" pump cylinder barrel 46 excessively away from pump mount face 144 resulting in a detrimental loss of hydraulic pressure in the system and a corresponding loss of system efficiency. Similarly, and as best seen in FIG. 7, bearing 198 in face 186 of motor block 47 includes slot 214 to relieve excessive hydraulic pressure between motor cylinder barrel 48 and face 186 of motor block 47.

Referring to FIGS. 4 and 11–12, shown is bearing cradle 156 integral with pump block 142 of pump and motor mechanism 36. Bearing cradle 156 is arranged oppositely respective of face 186 of motor block 47. In operation, motor cylinder barrel 48 rotates about motor mount face 186 and pistons 52, within each cylinder chamber 50, are displaced by fluid dependant on the angle of thrust bearing 158. The end extent 215 of each piston 52 contacts first plate 216 of thrust bearing 158 creating a ring of contact, preferably centered on thrust bearing 158 to provide a substantially uniform distribution of force through thrust bearing 158.

Referring to FIGS. 11 and 12, the arrangement between thrust bearing 158 and bearing cradle 156 will be described. Thrust bearing 158, includes a pair of annular plates 216, 218, a plurality of ball bearings 220 between the plates and retainer ring 222 to retain ball bearings 220. Customarily, plates 216 and 218 of thrust bearing 158 are similar, specifically plates 216 and 218 have radially inner surfaces 224 and radially outer perimeter surfaces 226 that are respectively substantially equal. In operation, plate 218 contacts annular face 160 of bearing cradle 156, remaining substantially stationary, while plate 216 rotates as end 215 of pistons 52 are hydraulically urged against plate 216. Thrust bearing 158, and specifically plate 218, is restrained from downward and side to side movement by a raised semi-circular shoulder portion 230 of bearing cradle 156 (FIGS. 4, 6 and 12). Additionally, thrust bearing 158 is restrained from movement in an upward direction, along annular face 160, by stop member 166. Stop member 166 is a stationary threaded fastener having outer head portion 232 contacting inner surface 224 of second plate 218 of thrust member 158. Stop member 166 threads into threaded hole 164 within bearing cradle 156 (FIGS. 4, 11 and 12). Hole 164 extends into bearing cradle 156 and is generally axially aligned with pistons 52 in motor cylinder barrel 48. Retaining bearing 158 in this manner eases assembly and reduces cost.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrostatic transmission comprising:
a variable displacement hydraulic pump including a pump cylinder barrel having a plurality of axially arranged cylinder chambers disposed therein, each said cylinder chamber having a reciprocating piston therein;
a pump block, said pump rotatably supported by said pump block;
a motor block separable from and connected to said pump block; and
a hydraulic motor rotatably supported by said motor block and hydraulically connected to said pump through a pair of connected fluid passages formed in said pump and motor blocks, said motor including an axis of rotation substantially perpendicular to an axis of rotation of said pump.

2. The hydrostatic transmission of claim 1, further comprising a transmission housing encasing said pump and motor blocks and including a quantity of hydraulic fluid therein.

3. The hydrostatic transmission of claim 2, wherein said housing is defined by a pair of housing halves removably attached at an interface, and said pump block is attached to one of said pair of housing halves.

4. The hydrostatic transmission of claim 3, wherein said interface between said housing halves defines a horizontal plane, said axis of rotation of said pump and said plane of said interface are substantially perpendicular.

5. The hydrostatic transmission of claim 2, wherein said pump block includes a pair of intake ports each in fluid communication with a respective said fluid passage, said pair of intake ports at least partially submerged in said hydraulic fluid.

6. The hydrostatic transmission of claim 5, wherein each of said pair of intake ports includes a check valve disposed therein.

7. The hydrostatic transmission of claim 1, wherein said pair of fluid passages is formed by a pair of sub-passages disposed in said pump block and a pair of sub-passages defined in said motor block, said sub-passages in said pump block are sealably connected to respective said sub-passages in said motor block through a pair of inserts.

8. The hydrostatic transmission of claim 1, wherein said pump block includes a pair of arcuate openings disposed on an external surface of said pump block and said motor block includes a pair of arcuate openings disposed on an external surface of said motor block, said arcuate orifices of said pump block are in fluid communication with said arcuate orifices of said motor block through each respective said fluid passage.

9. The hydrostatic transmission of claim 8, wherein each of said plurality of chambers within said pump cylinder barrel fluidly communicates with said pair of arcuate openings in said pump block through a port, each said port is disposed in said pump cylinder barrel.

10. The hydrostatic transmission of claim 1, wherein said pump block includes a pump mount face and a block mount face disposed on an external surface thereof, said pump mount face and said block mount face are substantially parallel.

11. The hydrostatic transmission of claim 10, wherein said motor block includes a motor mount face, said motor mount face is substantially perpendicular to said pump mount face.

12. The hydrostatic transmission of claim 1, wherein said motor includes a cylindrical barrel, said barrel extending axially over said pump block.

13. A hydrostatic transmission comprising:
a variable displacement hydraulic pump including a pump cylinder barrel having a plurality of axially arranged cylinder chambers disposed therein, each said cylinder chamber having a reciprocating piston therein;
a pump and motor block, said pump rotatably supported by said pump and motor block, said pump and motor block having a support portion;
a hydraulic motor rotatably supported by said pump and motor block and in hydraulic communication with said pump, said motor including a cylinder barrel having a plurality of axially arranged cylinder chambers disposed therein, each said cylinder chamber having a reciprocating piston therein, a portion of each said motor piston being extended from its said cylinder chamber, said motor including an axis of rotation substantially perpendicular to an axis of rotation of said pump;
a thrust bearing supported by said pump and motor block support portion and engaged with said motor piston extended portions; and
a stop member attached to said support portion of said pump and motor block and in contact with said thrust bearing, movement of said thrust bearing relative to said support portion being restrained by said stop member.

14. The hydrostatic transmission of claim 13, wherein said support portion of said pump and motor block comprises a bearing cradle that includes an inclined face and a shoulder portion, and said thrust bearing includes a perimeter portion, said shoulder portion of said bearing cradle partially surrounding and engaging said perimeter portion of said thrust bearing, whereby relative side-to-side movement and downward movement of said thrust bearing is restrained by said shoulder portion.

15. The hydrostatic transmission of claim 14, wherein said thrust bearing includes first and second annular plates having a plurality of ball bearings therebetween, said first plate overlying said bearing cradle and including a radially inner surface and a radially outer surface, said bearing cradle contacting said radially outer surface of said first plate, and said stop member is in contact with said radially inner surface of said first plate of said thrust bearing.

16. The hydrostatic transmission of claim 15, wherein said second plate of said thrust bearing includes a face engaging ends of said motor piston extended portions.

17. The hydrostatic transmission of claim 13, wherein said stop member includes a threaded portion which is engaged with said pump and motor block support portion, and a head portion which is in contact with said thrust bearing.

18. The hydrostatic transmission of claim 12, further comprising an output shaft attached to said motor cylinder barrel, said support portion of said pump and motor block includes an inclined surface and a shoulder portion partially surrounding said thrust bearing, said support portion of said pump and motor block includes a shaft clearance hole and said output shaft extends through said shaft clearance hole.

19. A hydrostatic transmission comprising:
a variable displacement hydraulic pump including a pump barrel having a plurality of axially arranged chambers disposed therein and each said chamber having a reciprocating piston therein;
a motor hydraulically connected to said pump and including a motor barrel having a plurality of axial arranged chambers disposed therein and each said chamber having a reciprocating piston therein;

a pump and motor block rotatably supporting said pump and motor; said pump and motor block including a bearing cradle attached thereto; and a thrust bearing engaging said plurality of pistons within said motor barrel, said thrust bearing supported by said bearing cradle.

20. The hydrostatic transmission of claim 19, wherein said cradle is integral with said pump and motor block.

21. The hydrostatic transmission of claim 19, further comprising an output shaft attached to said motor barrel, said cradle includes an inclined surface and a shoulder portion partially surrounding said thrust bearing, said bearing cradle includes a shaft clearance hole and said output shaft extends through said shaft hole.

* * * * *

UNITED STATES PATENT AND TRADEMARK OFFICE
CERTIFICATE OF CORRECTION

PATENT NO. : 6,301,885 B1
DATED : October 16, 2001
INVENTOR(S) : Kevin L. Johnson et al.

It is certified that error appears in the above-identified patent and that said Letters Patent is hereby corrected as shown below:

<u>Title page,</u>
Delete "Kevin J. Johnson" and substitute therefor -- Kevin L. Johnson --

Signed and Sealed this

Nineteenth Day of March, 2002

Attest:

JAMES E. ROGAN
Director of the United States Patent and Trademark Office

*Attesting Officer*